March 15, 1966  R. J. INGHAM ETAL  3,240,066

HIGH PRESSURE BOURDON TUBE

Filed Jan. 7, 1963

INVENTORS
ROBERT J. INGHAM
RICHARD K. McCALLY

BY *M. A. Gordin*

ATTORNEY

3,240,066
HIGH PRESSURE BOURDON TUBE

Robert J. Ingham and Richard K. McCally, Fairfield, Conn., assignors, by mesne assignments, to Dresser Industries, Inc., Dallas, Tex., a corporation of Delaware
Filed Jan. 7, 1963, Ser. No. 249,929
3 Claims. (Cl. 73—418)

This invention relates to instruments of the Bourdon tube type and more specifically to a novel and improved Bourdon tube particularly adapted for use with high pressures.

There has been an increasing demand and need for pressure measuring instruments capable of operating in pressure ranges as high as 100,000 p.s.i. While a conventional instrument may be designed for these high pressures, often the necessary increase in strength of the instrument results in a substantial increase in the overall size of the pressure responsive element. This increase in size of the pressure responsive element may preclude the use of the instrument in a particular installation. For example, while a conventional C-shaped Bourdon tube may be designed to withstand very high pressures, the necessary increase in overall size of the tube will be substantial; also, the unit stresses in such a Bourdon tube will be undesirably high, and the fatigue life and ability to withstand over pressure surges will not be as great as might be desired.

Accordingly, it is the object of the present invention to provide a novel and improved Bourdon tube particularly adapted for use in systems having pressures as high as 100,000 p.s.i. Included within this object are the objects of providing such a Bourdon tube having an improved fatigue life and improved ability to withstand pressure surges beyond rated pressure and in particular which will be of small size permitting its use with casings no larger than those normally necessary for housing a conventional C-shaped Bourdon tube having a much lesser pressure rating.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
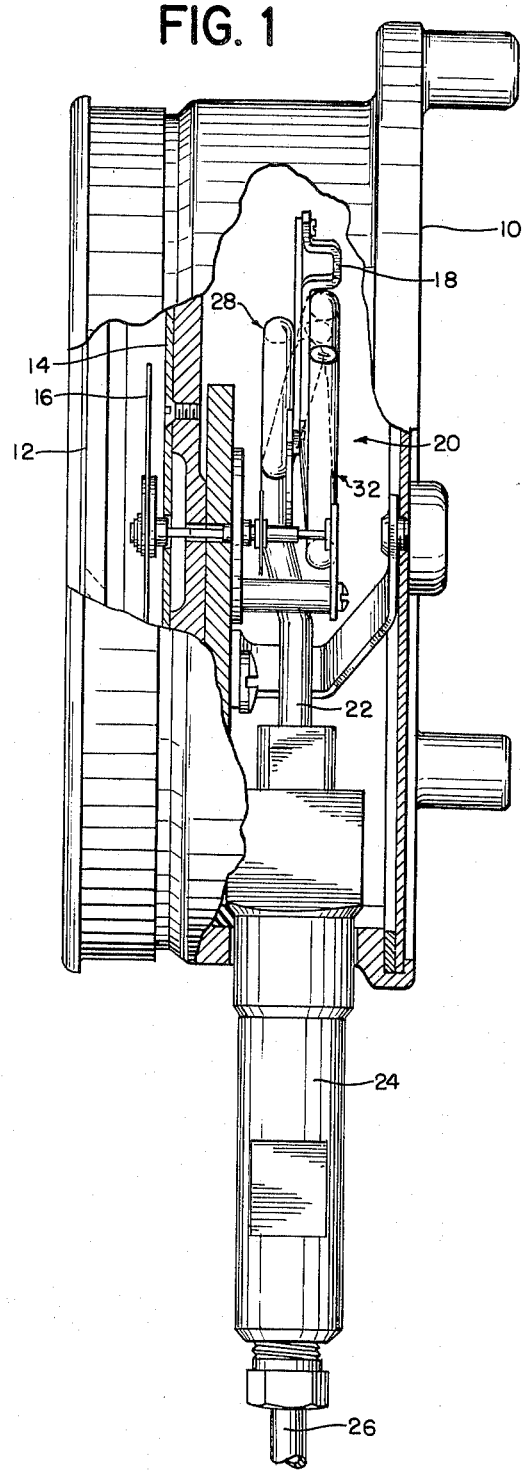
FIG. 1 is a side view of an exemplary pressure gauge incorporating the present invention with the gauge being partly cut away to reveal internal elements.

With reference to FIG. 1 of the drawings, there is shown an exemplary pressure gauge incorporating the Bourdon tube of this invention. The gauge comprises a casing 10 in the form of a generally cylindrical shell. The front end of the casing is closed by means including a cover glass 12. Mounted within the casing is a fixed dial plate 14 carrying numeric indicia. The indicia cooperate with a movable pointer 16 to indicate the pressure of the system to which the gauge is connected. The pointer is drivingly connected by suitable means to a tip bracket 18 fixed for movement with the free end of a Bourdon tube generally indicated at 20. The means for connecting the free end of the Bourdon tube to the pointer shaft may be of any conventional construction such as a pinion and gear segment system as generally shown in Patent No. 2,387,909 and which is well known to those skilled in the art.

Figure 2:
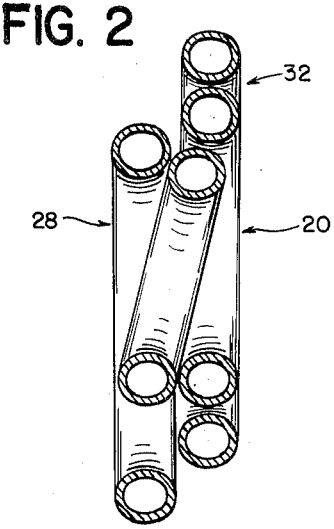
FIG. 2 is a diametrical cross-sectional view of the Bourdon tube of the instrument of FIG. 1.
Figure 3:
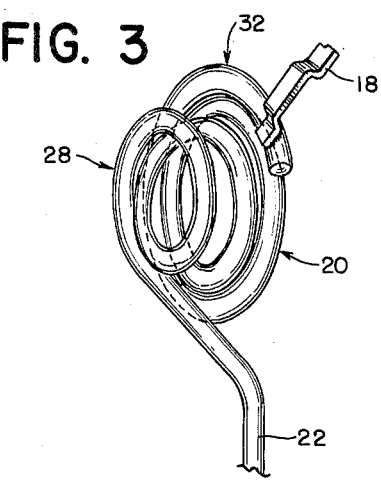
FIG. 3 is an isometric view of the Bourdon tube of the instrument of FIG. 1.

With reference to FIGS. 1–3, the Bourdon tube 20 comprises a relatively small diameter oval tube 22 which is fixed at one end to a socket 24 extending through the bottom of the casing 10, the socket forming anchoring means to fix the tube to the casing 10. Suitable means are provided for connecting the interior of the tube 22 to the interior of tubing 26 containing fluid, the pressure of which is to be measured. In accordance with the present invention, the deformable portion of the Bourdon tube 20 is shaped in a double spiral configuration. More particularly, the tube 22 extends from its fixed end into a flat spiral 28 the diameter of which decreases as the tube progresses toward the free end thereof. The spiral 28 terminates in a connecting portion 30 extending from within the spiral 28 and angularly of the axis of the spiral. The connecting portion 30 leads into the center of a second flat spiral 32, the diameter of which increases as the tube 22 progresses toward the free end thereof. The spiral 32 terminates at the free end of the tube 22 upon which the bracket 18 is mounted.

It will be noted that in accordance with the present invention, the portion of the tube 22 connecting the spirals 28 and 32 extends between the inner end of each spiral while the tip bracket 18 as well as the input end of the Bourdon tube are both located on the outside of their respective spirals. Thus, it will be seen that there has been provided a novel and improved Bourdon tube wherein the deformable portion of the tube comprises a pair of flat spirals lying in parallel general planes with one spiral being connected to the other spiral by a connecting portion extending from the interior of one spiral to the interior of the other spiral. In a Bourdon tube having a deformable portion as described, the overall dimension of the deformable portion, and thus the dimension of the Bourdon tube, as measured axially of the spirals may be substantially no greater than twice the diameter of the tubing as measured axially of the spirals. With this particular geometric configuration of the Bourdon tube of this invention, the tube may be utilized in conventional gauge casings designed for use with C-shaped Bourdon tubes of a much lesser pressure rating inasmuch as the overall size of our tube is less than would be required for a conventional C-shaped tube for the same pressure. More specifically, and as clearly shown in the drawing, no portion of tube 22 between the socket 24 and outer end of the spiral 32 is disposed beyond the planes of the oppositely facing outer end faces of the spirals 28 and 32 so that the entire deformable portion of the tube has a dimension as measured axially of the spirals which is no greater than the maximum dimension of the spirals as measured axially thereof.

Also, with a tube as shown and described, the unit stresses will be less than those of a C-shaped tube with a corresponding increase in fatigue life and ability to withstand overpressure surges.

While the Bourdon tube of this invention has been shown in the drawing as having a particular number of spirals and turns in each spiral, it will be understood that the number of turns in each spiral or the number of spirals may be varied to suit any particular application. It will also be observed that the invention is not limited to an equal number of turns in next adjacent spirals. Inasmuch as many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language in the following claims is intended to cover all of the generic and specific features of the invention herein described and all statements of the scope of the invention which, as a matter of language, might be said to fall therebetween.

We claim:

1. An improved Bourdon tube comprising a length of tubing wound into a pair of generally flat spirals lying in parallel general planes, the radially inner end of one spiral being connected to the radially inner end of the other spiral whereby the radially outer ends of the spirals may be connected respectively to a source of fluid pressure and a driven element, no portion of said tube projecting beyond said spirals in a direction axially of said spirals.

2. An instrument comprising a Bourdon tube, a casing said tube being disposed within the casing and comprising a length of tubing formed into a pair of flat spirals having parallel general planes with the radially inner end of one spiral being connected to the radially inner end of the other spiral, a driven element connected to the radially outer end of said one spiral, the tubing extending from the radially outer end of said other spiral, and anchoring means fixing said tubing to the casing at a point spaced from said outer end of said other spiral, no portion of said tubing between said anchoring means and said outer end of said one spiral being disposed outside said spirals as measured axially of said spirals.

3. An improved spiral wound Bourdon tube having a fluid pressure deformable portion including a pair of flat spirals lying in parallel general planes, the inner end of one spiral being connected to the inner end of the outer spiral, said deformable portion of the tube having a maximum dimension as measured in a direction axially of said pair of spirals which is no greater than the distance between the oppositely facing end faces of the pair of spirals.

References Cited by the Examiner

UNITED STATES PATENTS 1,385,133   7/1921   Ibbott _____ 73—411

OTHER REFERENCES

Brochure: "Ultra High Pressure Test Range," Heise Bourdon Tube Company, Inc., Newton, Conn., Oct. 10, 1960.

RICHARD C. QUEISSER, *Primary Examiner.*

JOSEPH P. STRIZAK, *Examiner.*